United States Patent [19]

Negus

[11] Patent Number: 5,111,455
[45] Date of Patent: May 5, 1992

[54] INTERLEAVED TIME-DIVISION MULTIPLEXOR WITH PHASE-COMPENSATED FREQUENCY DOUBLERS

[75] Inventor: Kevin J. Negus, San Jose, Calif.

[73] Assignee: Avantek, Inc., Milpitas, Calif.

[21] Appl. No.: 572,854

[22] Filed: Aug. 24, 1990

[51] Int. Cl.⁵ .................... H04J 3/04; H03K 17/00
[52] U.S. Cl. ...................................... 370/112; 328/104
[58] Field of Search .................... 370/112, 77, 78; 307/243; 328/104, 61

[56] References Cited

U.S. PATENT DOCUMENTS

| | | | |
|---|---|---|---|
| 3,614,327 | 10/1971 | Low et al. | 328/104 |
| 3,995,119 | 11/1976 | Pachynski, Jr. | 179/15 AF |
| 4,593,390 | 6/1986 | Hildebrand et al. | 370/112 |
| 4,648,105 | 3/1987 | Priebe et al. | 377/64 |
| 4,672,647 | 6/1987 | Yamaguchi et al. | 377/77 |
| 4,697,279 | 9/1987 | Baratti et al. | 377/73 |
| 4,703,471 | 10/1987 | Fitelson et al. | 370/1 |
| 4,727,542 | 2/1988 | Rokugo et al. | 370/112 |
| 4,754,456 | 6/1988 | Yato et al. | 370/112 |
| 4,789,984 | 12/1988 | Swartz | 370/112 |
| 4,825,105 | 4/1989 | Holzle | 307/440 |
| 4,837,763 | 6/1989 | Sasaki | 328/104 |
| 4,926,423 | 5/1990 | Zukowski | 370/112 |
| 4,965,797 | 10/1990 | Yamane et al. | 328/104 |

OTHER PUBLICATIONS

R. Reimann and H. M. Rein, "A 4:1 Time-Division Multiplexer IC for Bit Rates up to 6 Gbit/s Based on a Standard Bipolar Technology," IEEE Journal of Solid-State Circuits, vol. SC-21, No. 5, Oct. 1986, pp. 785-789.

H. M. Rein, "Multi-Gigabit-Per-Second Silicon Bipolar IC's for Future Optical-Fiber Transmission Systems," IEEE Journal of Solid-State Circuits, vol. 23, No. 3, Jun. 1988, pp. 664-675.

G. Flower, B. Lai, D. Lee, D. Sears and T. Stockwell, "Masterslice II: A Quick Turnaround Prototyping and Production Tool for Gigaherz [sic] IC's, " IEEE Bipolar Circuits and Technology Meeting Proceedings, pp. 23-36.

Data Sheet for Sony CXB1113Q 4-Bit Multiplexer, pp. 5-32-5-36.

N. Yoshikai, S. Kawanishi, M. Suzuki and S. Konaka, "Monolithic Integrated 4:1 Multiplexer and Demultiplexer Operating up to 4.8 Gbit/s," Electronics Letters, 14th Feb. 1985, vol. 21, No. 4, pp. 149-151.

*Primary Examiner*—Douglas W. Olms
*Assistant Examiner*—H. Kizou

[57] ABSTRACT

A synchronous, interleaved, time-division M:1 multiplexor. Following an input stage of parallel synchronous latches for latching M incoming parallel data bits (where M is an integer power of two equal to or greater than four) is an intermediate stage of parallel synchronous latches. The intermediate latches are clocked with selected phases of an M-phase clock having M equally-spaced phases of a clock signal having a frequency of B/M (where B is the outgoing bit rate) to latch each bit at a time at least 2/B (i.e., two outgoing bit periods) after such bit is received from its respective input latch. A first stage of 2:1 multiplexors, following the intermediate latches and used to begin multiplexing the latched bits, are clocked with selected phases of the M-phase clock to begin multiplexing each bit at a time at least 1/B (i.e., one outgoing bit period) after such bit is received from its respective intermediate latch. Further stages of 2:1 multiplexors complete the multiplexing and are each clocked with clock signals which are successively doubled in frequency at each additional stage of 2:1 multiplexors (e.g., 2B/M, 4B/M, 8B/M, ...) and phase compensated so as to align the clock signals with their respective data. The phase-compensated, frequency doubling for each 2:1 multiplexor stage is done by "exclusive-ORing" pairs of quadrature clock signals from the immediately preceding 2:1 multiplexor stage.

38 Claims, 8 Drawing Sheets

INTERLEAVED TIME-DIVISION MULTIPLEXOR WITH PHASE-COMPENSATED FREQUENCY DOUBLERS

BACKGROUND OF THE INVENTION

1. Field of the Invention

The present invention relates to high speed digital circuits, and in particular, to high speed time-division multiplexor circuits.

2. Description of the Related Art

Modern data networks in which multiple computers are interconnected for sharing instructions and data, e.g., local area networks ("LANs"), typically operate over a serial data medium. The computers themselves, however, typically process their instructions or data internally in parallel formats. Therefore, to interface to the data network, each computer must use an M:1 multiplexor to transfer data or instructions into the network, where M is the number of parallel bits of instructions or data which must be time-division multiplexed into a serial bit stream.

As shown in FIG. 1, an M:1 multiplexor has M inputs $D_0$-$D_{M-1}$, a clock input CLK for clocking the M parallel data inputs $D_0$-$D_{M-1}$ into the multiplexor, a serial data output Q, and a trigger output T. The clock input signal CLK must have a frequency equal to the bit rate of the serial output signal Q. The trigger output T has a frequency equal to that of the clock input signal (i.e., the bit rate of the serial output Q) divided by the number M of parallel data input bits. Thus, the clock input signal CLK must have a frequency equal to M times the bit rate of the parallel data inputs $D_0$-$D_{M-1}$.

FIG. 2 illustrates, for the case of M=4 bits, a simple type of time-division multiplexor based upon an M-bit shift register. The input data bits $D_0$-$D_3$ are loaded in parallel on every fourth clock pulse, with the most significant bit $D_3$ being loaded into a D-type flip-flop, and the less significant bits $D_0$-$D_2$ being loaded into 2:1 interleavers, e.g., multiplexors. On the other three clock pulses the data is shifted serially to the output Q. The clock signal CLK, used to clock the D-type flip-flops in the shift register, is also frequency-divided to produce the clock, or select S, signals for the 2:1 interleavers and the trigger output T.

With a shift register based, time-division multiplexor as shown in FIG. 2, it will be appreciated that the shift register section requires the following:

$$T_{bit} > T_{CLK \to Q} + T_{D1,2 \to Q}$$

where:

$T_{bit}$ = outgoing bit period for serial output $Q$

= $1/B$ $B$ = outgoing bit rate for serial output $Q$ $T_{CLK \to Q} \approx 2T_{min}$ $T_{D1,2 \to Q} \approx T_{min}$ $T_{min}$ = qualitative approximation for minimum signal propagation time (e.g., gate delay).

It will be further appreciated that the bit rate limitation for the load pulse generation section, i.e., the frequency divider section, of the multiplexor of FIG. 2 can be shown to be similar. Thus, the maximum bit rate for the multiplexor architecture of FIG. 2 is determined in accordance with the following:

$$B_{max} < \frac{1}{T_{CLK \to Q} + T_{D1,2 \to Q}} \approx \frac{1}{3T_{min}}$$

In practice, however, the shift register based, time-division multiplexor of FIG. 2 cannot achieve this theoretical maximum speed due to the effects of signal delay variations among the various signal paths for the input and output signals. Furthermore, the multiplexor of FIG. 2 must be operated with a clock signal frequency equal to the outgoing bit rate. This can be a problem when this type of multiplexor is used to interface with a very high speed data network medium, such as an optical fiber. Full advantage of the extremely high bit rate capabilities of an optical fiber cannot be realized by simply clocking a solid state electronic multiplexor at a higher rate. In other words, the electronics simply cannot reliably keep pace with the elevated bit rates possible with optical fibers.

In an attempt to increase the architecturally limited maximum bit rate of the multiplexor of FIG. 2, and to overcome the requirement of using a clock signal having a frequency equal to the outgoing bit rate, the interleaved, time-division multiplexor of FIG. 3 was developed. (As in FIG. 2, the illustrated multiplexor in FIG. 3 is for the case of M=4 bits.) The four parallel input bits $D_0$-$D_3$ are loaded simultaneously into D-type flip-flops, the outputs of which are interleaved with two 2:1 multiplexors. The outputs of the two multiplexors are then, in turn, multiplexed with another 2:1 multiplexor to produce the serial output Q. The flip-flops and first two multiplexors are clocked with various phases of the frequency-divided clock signal. The output multiplexor is clocked directly by the input clock signal, but at a delayed point in time in accordance with a time delay introduced by a delay line.

The input clock signal for the multiplexor of FIG. 3 has a frequency which is half that of the clock signal for the multiplexor of FIG. 2. It is further frequency-divided with multiple phases by coupling two D-type flip-flops together as a divide-by-two frequency divider circuit.

For the multiplexor of FIG. 3, it will be appreciated that the input data flip-flops, in conjunction with the clock divider flip-flops, requires the following:

$T_{bit} > T_{CLK \to Q}/2$
and
$T_{bit} > T_{D \to Q}$
Therefore:

$$B_{max} \approx \frac{1}{T_{min}}$$

Within the interleaving output stages, each 2:1 multiplexor requires only that data be valid at its output within one bit period $T_{bit}$. This in theory requires the following:

$T_{bit} > T_{D1,2 \to Q}$

Therefore:

$$B_{max} < \frac{1}{T_{D1,2 \to Q}} \approx \frac{1}{T_{min}}$$

Hence, the interleaved time-division multiplexor of FIG. 3 appears to be faster than the shift register based, time-division multiplexor of FIG. 2 by a factor of three. However, the interleaved multiplexor of FIG. 3 with single phase input latches and a clock delay line has practical limitations. First, fabricating an optimum delay line for the clock signal, required for ensuring clocking of the final 2:1 multiplexor at the proper time so as to achieve maximum bit rate, is very difficult due to normal semiconductor fabrication process variations. Second, the use of single stage, single phase input latches requires that each input data bit be latched through its input latch stage and through its first interleaver stage within one bit period $T_{bit}$. In other words, this requires the following:

$$T_{bit} > T_{CLK \rightarrow Q} + T_{D1,2 \rightarrow Q}$$

Thus, since the overall maximum bit rate cannot exceed the maximum bit rate of the slowest portion of the circuit, the maximum bit rate for the interleaved multiplexor of FIG. 3 is the following:

$$B_{max} < \frac{1}{T_{CLK \rightarrow Q} + T_{D1,2 \rightarrow Q}} \approx \frac{1}{3T_{min}}$$

Hence, the interleaved time-division multiplexor of FIG. 3 is no faster in theory than the shift register based, time-division multiplexor of FIG. 2.

Thus, it would be desirable to have an M:1 time-division multiplexor with an architecture providing a higher maximum bit rate while still requiring a clock signal having a frequency lower than the outgoing serial bit rate. It would be further desirable to have such a multiplexor with the foregoing characteristics without requiring a delay line for phase compensating the clock signal for the final interleaving stage. This is particularly desirable for $M \geq 8$ bits since multiple matched delay lines for phase compensating multiple clock signals having different frequencies are then required.

SUMMARY OF THE INVENTION

A synchronous, interleaved, time-division M:1 multiplexor in accordance with the present invention uses M equally-spaced phases of a clock signal having a frequency of B/M to latch M incoming parallel data bits (where B is the outgoing serial bit rate and M is an integer power of two equal to or greater than four). An intermediate stage of parallel input latches are clocked with selected phases of an M-phase clock signal to intermediately latch each incoming bit at a time at least 2/B (i.e., two outgoing serial bit periods) after such bit is available for multiplexing.

Following the intermediate stage of latches is a stage of 2:1 interleavers, e.g., 2:1 multiplexors, which are used to begin interleaving the latched bits. These interleavers are clocked with selective phases of the M-phase clock signal to begin interleaving each bit at a time at least 1/B (i.e., one outgoing serial bit period) after such bit is available from its respective intermediate latch.

Following this first stage of interleavers is a second stage of interleavers, e.g., 2:1 multiplexors, which are used to continue interleaving the latched and interleaved bits. These interleavers within the second stage of interleavers are each clocked with selected phases of a clock signal having a frequency twice that of the M-phase clock (i.e., clock frequency of 2B/M).

Further stages of interleavers complete the multiplexing of the M bits, as needed. Each successive stage of interleavers is clocked with phase-compensated clock signals having frequencies which are double those of the clock signals for the preceding stage of interleavers (i.e., 2B/M for the first stage of interleavers, 4B/M for the second stage, 8B/M for the third stage, etc.).

Further in accordance with the present invention, the clock signals for each successive stage of interleavers are frequency-doubled and phase-compensated by passing pairs of quadrature phases of the clock signal phases of the immediately preceding stage of interleavers through an exclusive-OR gate.

In an alternative embodiment of a multiplexor in accordance with the present invention, a second intermediate stage of parallel latches is used to latch each intermediately latched bit at a time at least 2/B after such bit is available from the first intermediate stage of latches. Furthermore, the first stage of interleavers is clocked with selective phases of the M-phase clock signal to begin interleaving each bit at a time at least 2/B after such bit is available from its respective second intermediate latch.

Still further in accordance with the present invention, the modular logic topology produces a "building block" multiplexor design for multiplexing M parallel bits.

These and other objectives, features and advantages of the present invention will be readily understood upon consideration of the following detailed description of the invention and the accompanying drawings.

BRIEF DESCRIPTION OF THE DRAWINGS

Throughout the figures, similar elements are designated with like numerals.

DETAILED DESCRIPTION OF THE INVENTION

Figure 4:
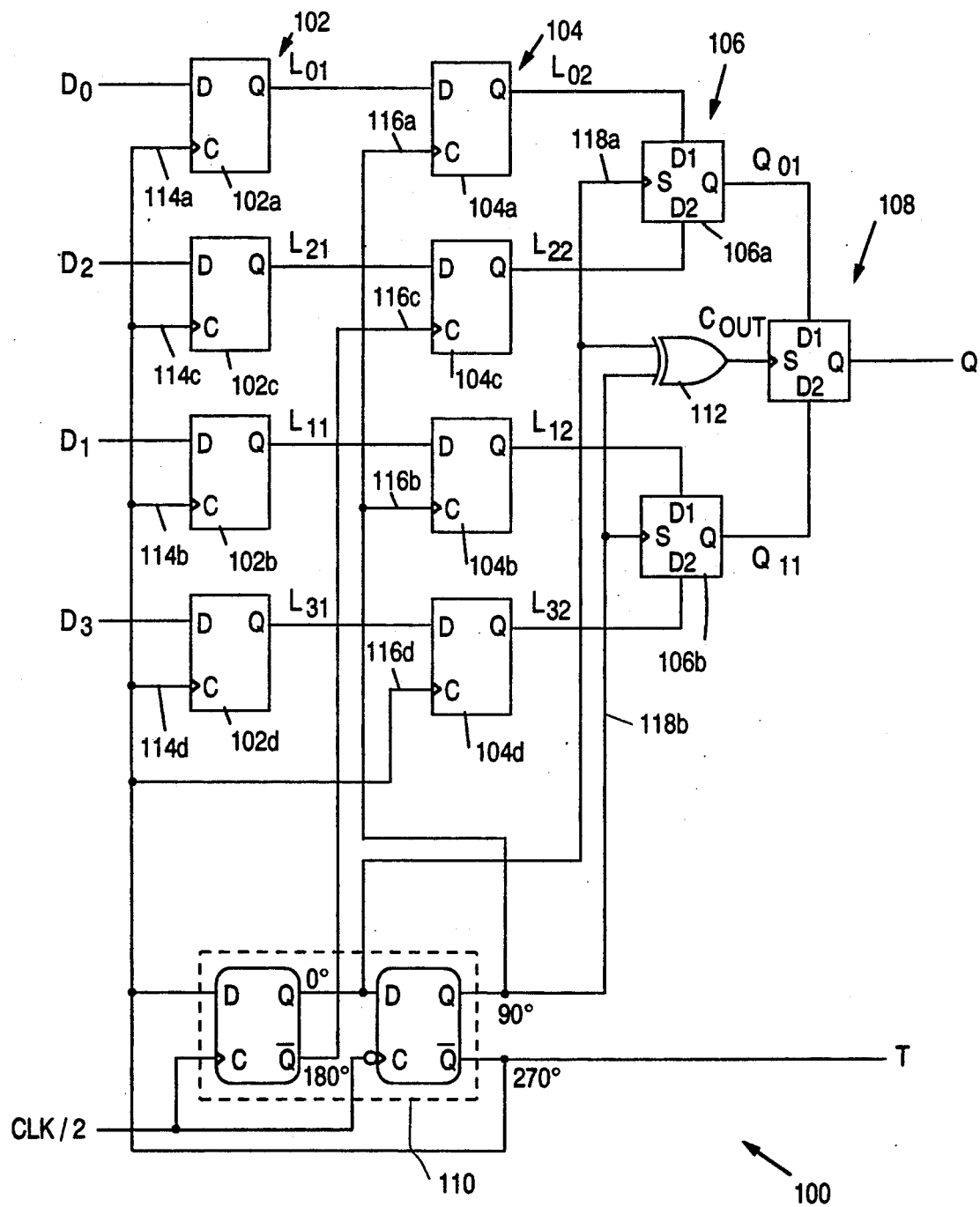
FIG. 4 illustrates a block diagram for a preferred embodiment of an interleaved time-division 4:1 multiplexor in accordance with the present invention.

Referring to FIG. 4, a synchronous, interleaved, time-division M:1 multiplexor for the case of M=4 bits in accordance with the present invention consists of: an input stage 102 of latches; an intermediate stage 104 of latches; a first stage 106 of interleavers (e.g., 2:1 multiplexors); a second interleaver stage 108; a multiphase clock signal generator 110; and a clock signal frequency doubler 112.

The multiphase clock signal generator 110 receives a clock signal CLK/2, which has a frequency equal to half that of the bit rate B of the output serial bit stream Q. This clock signal CLK/2 is divided by two and provided in phases of 0°, 9°, 180°, 270° as shown in FIG. 4 to the remainder of the multiplexor 100. The input latches 102 are clocked with the 270° phase. The intermediate latches 104 are clocked with the 90°, 180° and 270° phase signals. The first interleavers 106 are clocked with the quadrature 0° and 90° phase signals. As described below and illustrated in the ideal timing diagram (i.e., zero propagation delays) of FIG. 5, the parallel input data bits $D_0$-$D_3$ are successively latched within the input stage 102 and intermediate stage 104 of latches in a phase staggered manner prior to subsequent interleaving by the first 106 and second 108 stages of interleavers.

Figure 5:
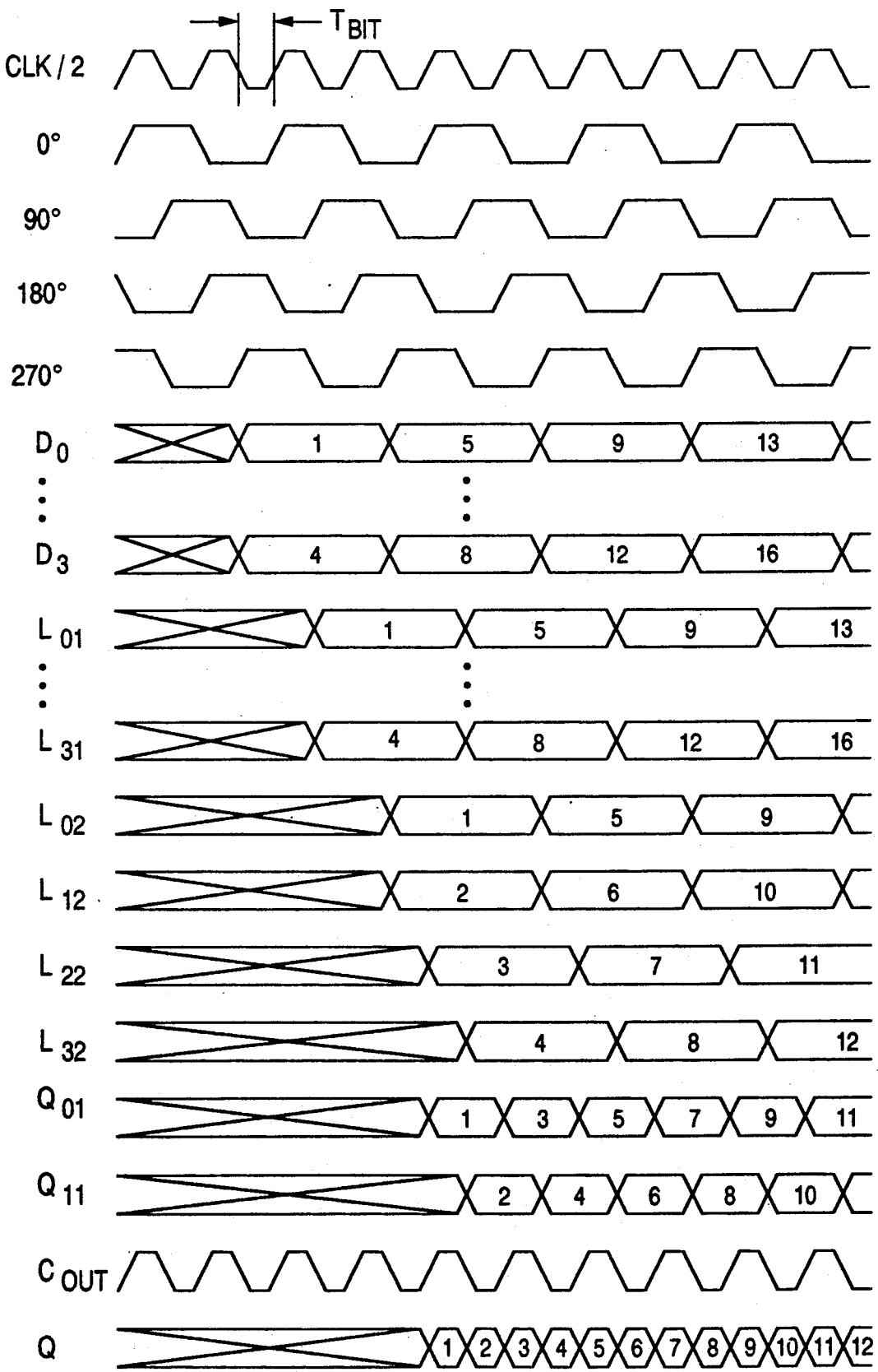
FIG. 5 illustrates an ideal signal timing diagram for the multiplexor of FIG. 4.

Referring to FIGS. 4 and 5, the parallel data input bits $D_0$-$D_3$ are loaded simultaneously into the input latches 102 on the 270° phase signal. The 270° phase signal, as well as the 0°, 90° and 180° phase signals, are generated by the frequency divider circuit 110. As shown in FIG. 4, this frequency divider circuit 110 can consist of cross-coupled, D-type flip-flops connected as a divide-by-two toggle. However, it will be recognized that other types of frequency divider circuit configurations are possible, e.g., using J-K flip-flops, binary counters or shift registers.

The latched parallel data bits $L_{01}$-$L_{31}$ are then loaded into the intermediate latches 104 on the 90°, 180° and 270° phase signals. This clock phasing for the intermediate latches 104 provides a minimum of two bit periods (i.e., 180 degrees phase margin for M=4 bits) between the corresponding input 114a–114d and intermediate 116a–116d clock signals latching each respective data bit in the input 102 and intermediate 104 latches, respectively.

For example, for the least significant bit $D_0$, the phase margin between its corresponding input 114a and intermediate 116a clock signals, i.e., the 270° phase for its input latch 102a and the 90° phase for its intermediate latch 104a, is 180 degrees, or two bit periods. Therefore, the minimum time available before which the input bit $D_0$ must be valid as a latched input bit $L_{01}$ for latching by its intermediate latch 104a is equal to two outgoing serial bit periods, i.e., $2T_{bit}$. This translates to a maximum outgoing serial bit rate $B_{max}$ which can be described by the following:

$$T_{bit} > T_{CLK \to Q}/2$$

Therefore:

$$B_{max} < \frac{2}{T_{CLK \to Q}} \approx \frac{2}{2T_{min}} = \frac{1}{T_{min}}$$

Similarly, for the remaining input data bits $D_1$-$D_3$, the phase margins between their input 114b–114a and intermediate 116b–116d clock signals is at least 180 degrees, thereby providing times equivalent to two outgoing serial bit periods, i.e., $2T_{bit}$, for each of the input bits $D_1$-$D_3$ to become latched input bits $L_{11}$-$L_{31}$.

Further similarly, the phases for the intermediate clock signals 116a–116d for the intermediate latches 104 and the phases for the clock signals 118a–118b for the first stage of interleavers 106 are selected so that the minimum phase margin for the corresponding clock signals used for transferring their respective data bits to the first interleaver stage 106 is 90 degrees, or one bit period.

For example, for the least significant latched input bit $L_{01}$, the phase margin between its intermediate latch clock signal 116a and the clock signal 118a directing the intermediately latched data bit $L_{02}$ through its interleaver 106a is 90 degrees. This 90 degrees minimum phase margin results in a time equal to one outgoing serial bit period, i.e., $T_{bit}$, after which the intermediately latched bit $L_{02}$ must be available for interleaving by its interleaver 106a. This can be described as follows:

$$T_{bit} > T_{CLK \to Q} \approx 2T_{min}$$

Therefore, the maximum bit rate $B_{max}$ due to this timing requirement can be described as follows:

$$B_{max} < \frac{1}{2T_{min}}$$

Figure 1:
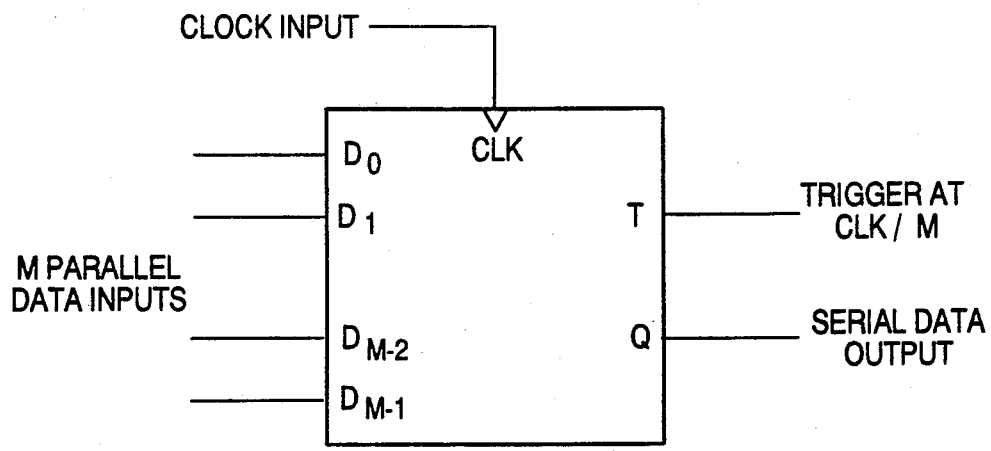
FIG. 1 illustrates a block diagram for an M:1 multiplexor.
Figure 2:
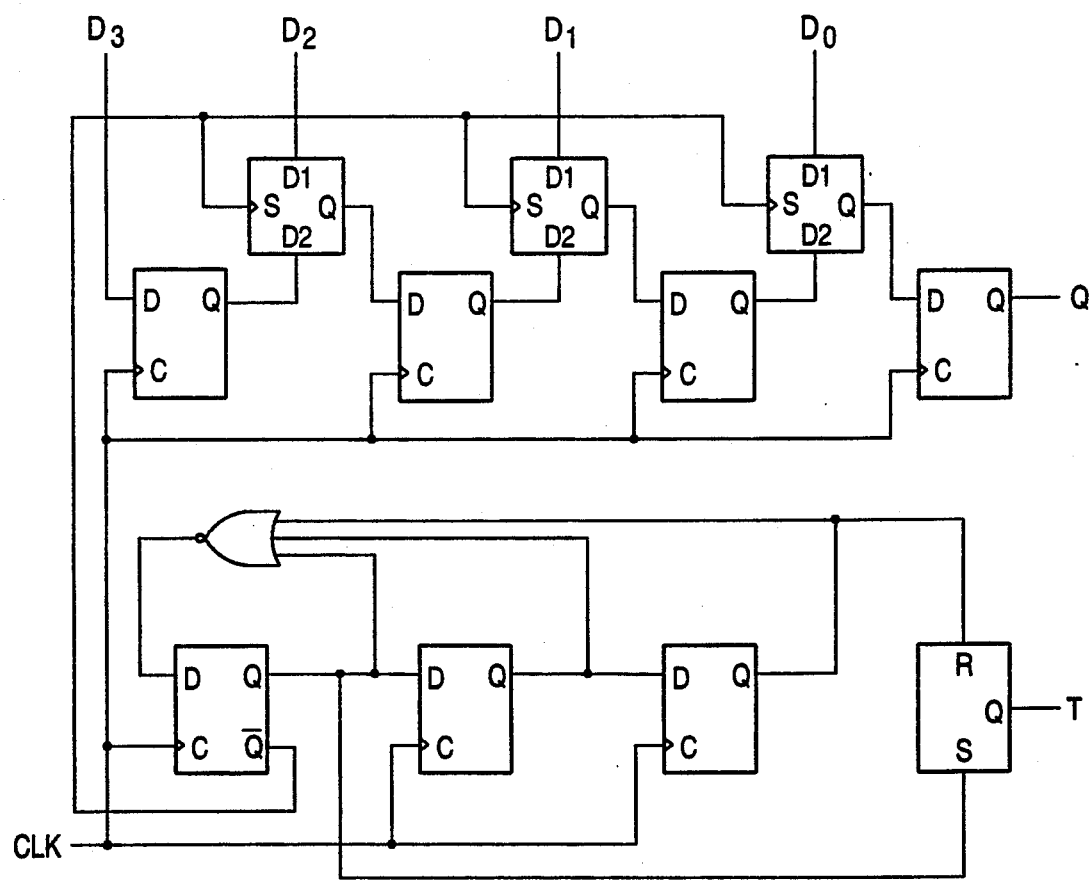
FIG. 2 illustrates a block diagram for a prior art shift registered based, time-division 4:1 multiplexor.
Figure 3:
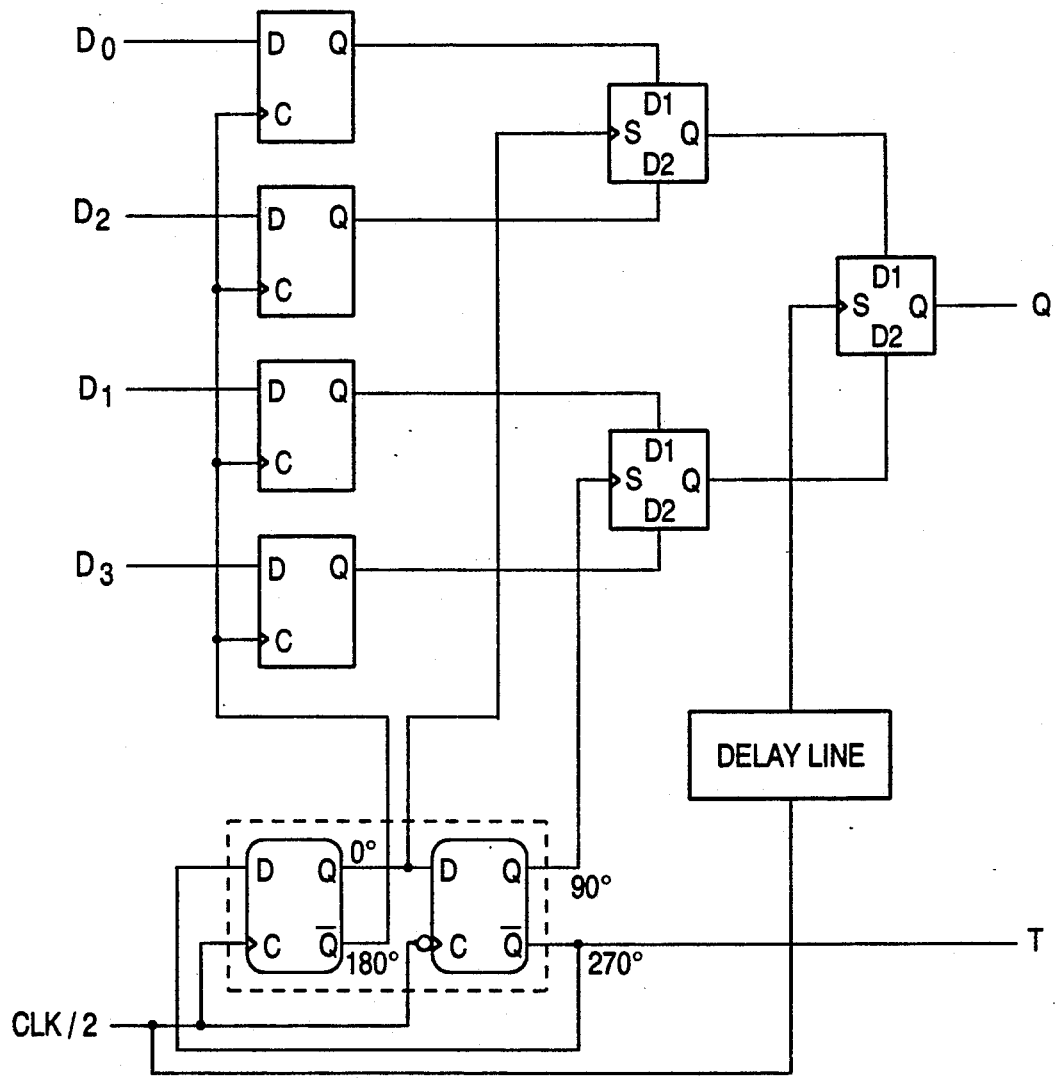
FIG. 3 illustrates a block diagram for a prior art interleaved time-division 4:1 multiplexor.

Thus, the ideal maximum bit rate for an interleaved multiplexor in accordance with the present invention, as illustrated in FIG. 4, exceeds that of a conventional interleaved multiplexor, as illustrated in FIG. 3, by 50 percent.

It will be appreciated that, ideally for optimum performance, the triggering edge of the clock, or select S, signal $C_{OUT}$ for the output multiplexor 108 should occur exactly as the output data $Q_{01}$, $Q_{11}$ of the previous stage 106 become valid. Therefore, phase-compensated clocking is required. In other words, the clock signal $C_{OUT}$ must become active substantially simultaneously as the output data $Q_{01}$, $Q_{11}$ of the previous stage 106 becomes valid.

This phase-compensated clocking can be achieved by using a frequency multiplier in the form of an exclusive-OR gate 112 to multiply the quadrature phases 0°,90° of the clock signals 118a–118b for the first stage of interleavers 106. This provides the frequency-doubled clock signal $C_{OUT}$ for the output interleaver 108 with clock signal edges which are delayed by a time period $T_{XOR}$ which is substantially equal to the time delay $T_{D1,2 \to Q}$ introduced by the first stage 106 of interleavers. Therefore, the frequency-doubled clock signal $C_{OUT}$ for the output interleaver 108 is phase-compensated with respect to the clock signals 118a–118b for the first stage 106 of interleavers, thereby providing for optimum performance.

As will be appreciated, other types of frequency doublers known in the art can be used to provide the phase-compensated, frequency-doubled clock signal $C_{OUT}$. For example, selected phases from the multiphase clock signal can be multiplied with a passive mixer, an analog multiplier or a Gilbert Cell multiplier.

Figure 6:
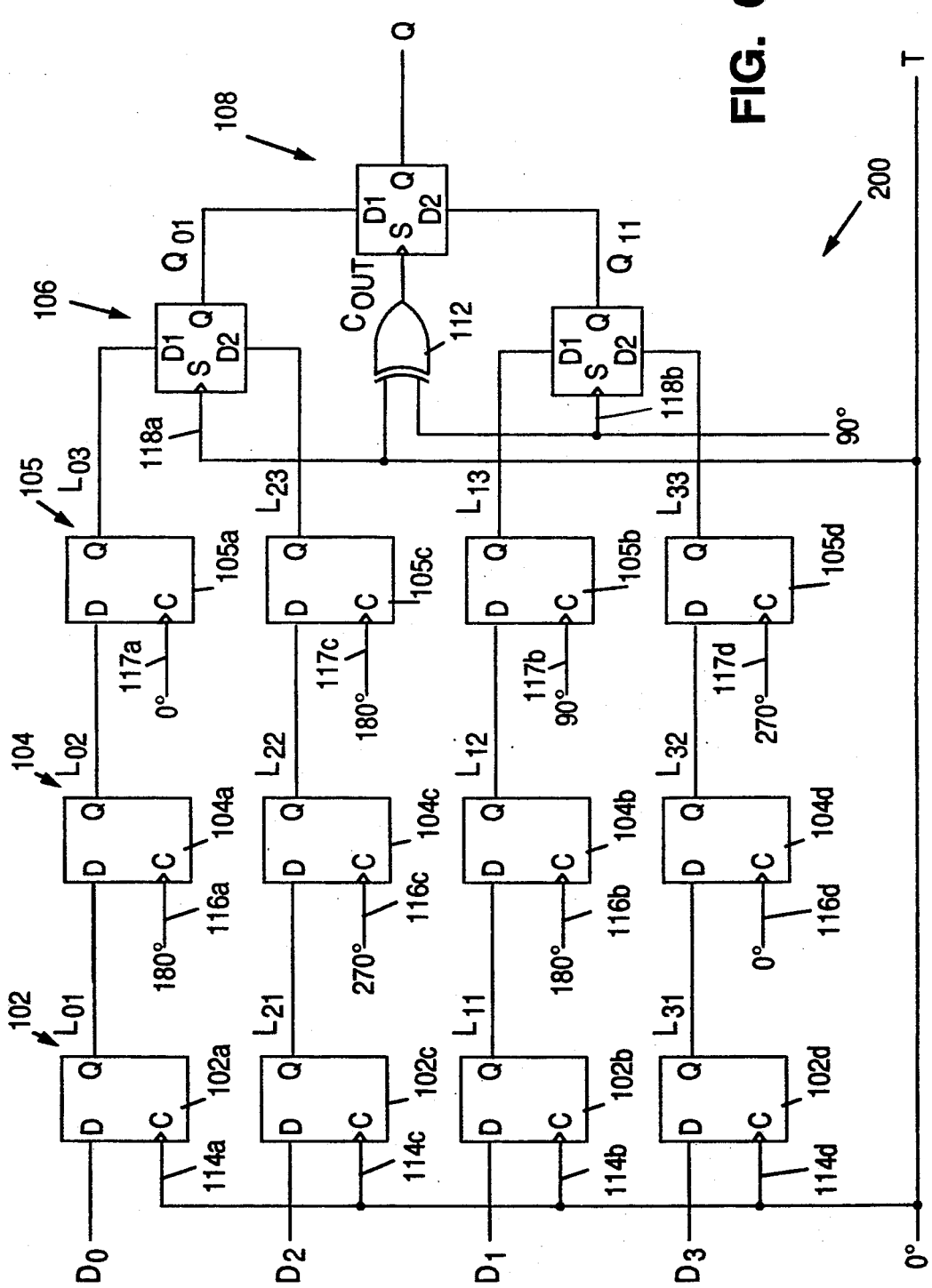
FIG. 6 illustrates a block diagram for an alternative preferred embodiment of an interleaved time-division 4:1 multiplexor in accordance with the present invention.
Figure 7:
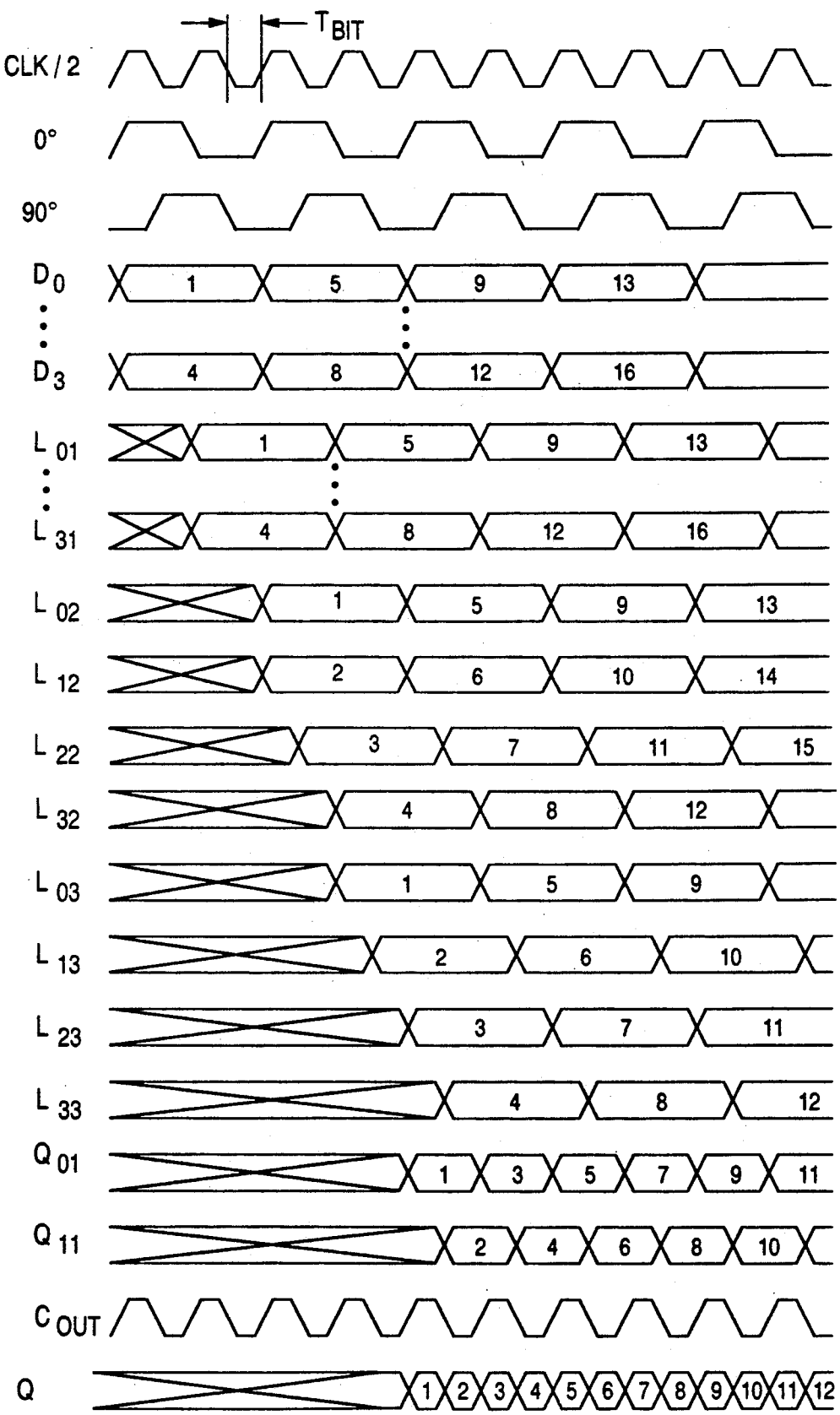
FIG. 7 illustrates an ideal signal timing diagram for the multiplexor of FIG. 6.

Referring to FIGS. 6 and 7, the performance, i.e., the maximum bit rate $B_{max}$, of the interleaved multiplexor in accordance with the present invention can be improved further by adding a second intermediate state 105 of latches. By doing so, greater flexibility in the distribution of the phases of the clock signals 114a–114d, 116a–116d, 117a–117d for the latches 102, 104, 105 can be achieved.

For example, as seen in FIGS. 6 and 7, and in accordance with the discussion above, the phases of the clock signals 114a–114d, 116a–116d, 117a–117d for the latches 102, 104, 105 are distributed so as to provide a minimum of 180 degrees of phase margin (or two bit periods)

between the corresponding, respective clock signals 114a-114d, 116a-116d, 117a-117d. Furthermore, this selection of phases, in conjunction with the quadrature phases, 0°, 90° for the clock signals 118a-118b for the first stage 106 of interleavers, maintains this minimum clock phase margin of 180 degrees through the first stage 106 of interleavers.

As discussed above, by providing a minimum phase margin of 180 degrees, the minimum time available before which each input $D_0$-$D_3$ or first two intermediate $L_{01}$-$L_{103}$, $L_{02}$-$L_{32}$ latched bits must be valid for latching by their respective subsequent latch stages 102, 104, 105 is equal to two outgoing serial bit periods, i.e., $2T_{bit}$. This again translates to a maximum outgoing serial bit rate $B_{max}$ which can be described by the following:

$$T_{bit} > T_{CLK \rightarrow Q}/2$$

Therefore:

$$B_{max} < \frac{2}{T_{CLK \rightarrow Q}} \approx \frac{2}{2T_{min}} = \frac{1}{T_{min}}$$

Thus, the ideal maximum bit rate for this alternative embodiment of an interleaved multiplexor in accordance with the present invention exceeds that of a conventional interleaved multiplexor, as illustrated in FIG. 3, by 200 percent.

It must be understood, however, that the second intermediate stage 105 of latches is only necessary for the case of M=4 bits. In accordance with the following discussion, where M≧8 bits, optimal performance can be achieved with only one intermediate stage 104 of latches. Where M≧8 bits, there are M≧8 phases of the multiphase clock signal available. This provides greater flexibility in selecting those clock phases which provide the requisite time delays between the corresponding, respective clock signals 114a-114d, 116a-116d, 118a-118b, as discussed above.

Figure 8:
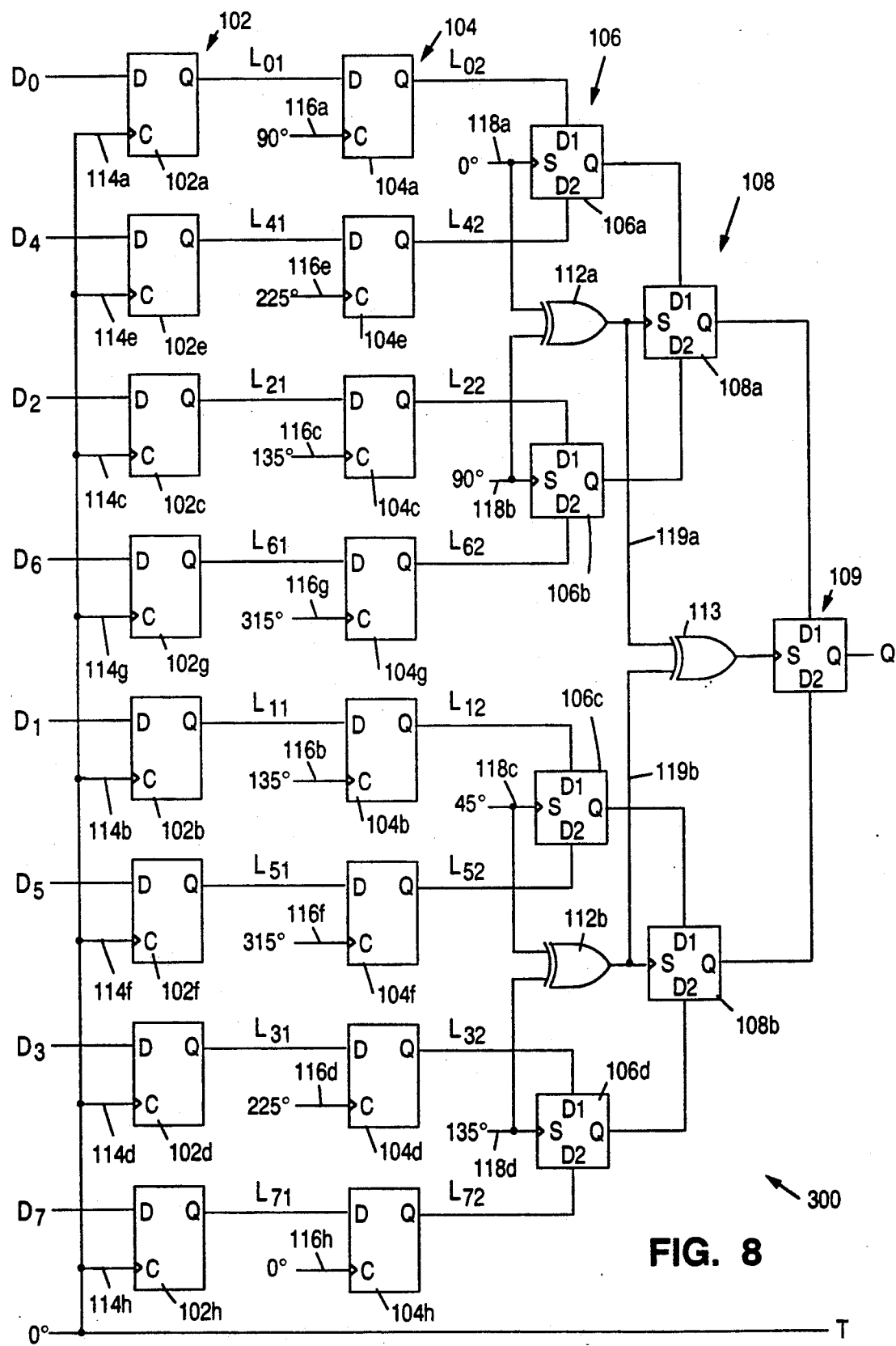
FIG. 8 illustrates a block diagram for a preferred embodiment of an interleaved time-division 8:1 multiplexor in accordance with the present invention.

Referring to FIG. 8, a synchronous, interleaved, time-division M:1 multiplexor in accordance with the present invention for the case of M=8 bits, similar to the 4:1 multiplexor of FIG. 4, consists of input 102 and intermediate 104 stages of latches and first 106 and second 108 stages of interleavers. Due to the increased number of bits, a third interleaver stage 109 is required.

Figure 9:
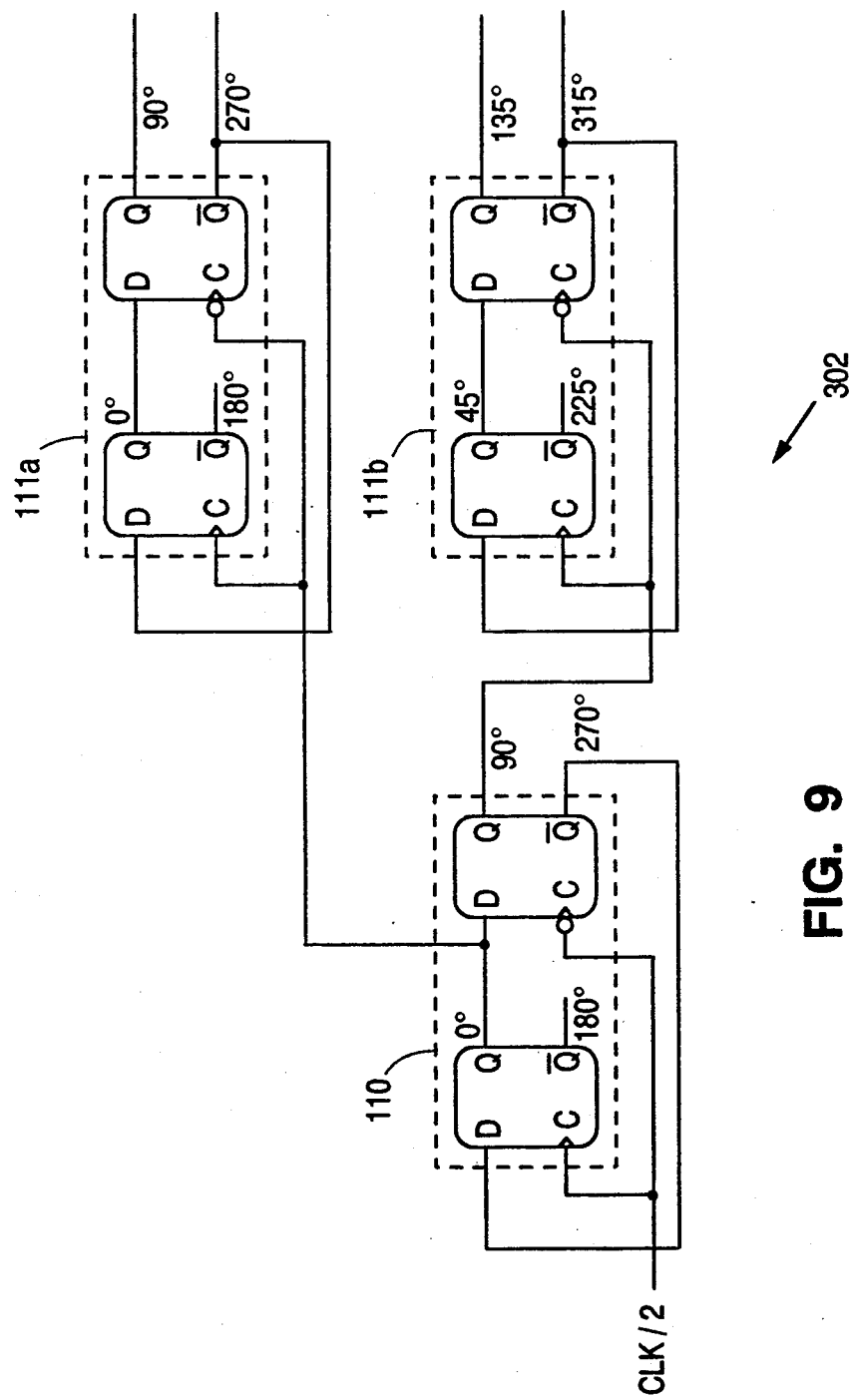
FIG. 9 illustrates a block diagram for an exemplary multiphase clock signal generator for the multiplexor of FIG. 8.

Similar to the multiplexor 100 of FIG. 4, the input data bits $D_0$-$D_7$ are clocked into the input latches 102 with a single phase 0° of a multiphase clock. In the case of M=8 bits, the multiphase clock has eight equidistant phases 0°, 45°, 90°, 135°, 180°, 225°, 270°, 315°. As an extension to the multiphase clock signal generator 110 of FIG. 4, an eight-phase clock signal generator 302, illustrated in FIG. 9, can be constructed using two additional pairs 111a, 111b of cross-coupled, D-type flip-flops. However, as will be appreciated, many alternative means known in the art can be used to generate multiple phases of a clock signal, e.g., flip-flops, counters, shift registers, or R-C (resistive-capacitive) phase shifters.

Similar to the discussion above for the interleaved multiplexors 100, 200 of FIGS. 4 and 6, the phases of the corresponding, respective clock signals 114a-114h, 116a-116h, 118a-118d for the input latches 102, intermediate latches 104 and first stage 106 of interleavers are selected to provide a minimum clock phase margin of 90 degrees (which corresponds to two bit periods for the M=8 case). Further similar to the discussion above, this provides minimum time availabilities before which the respective input $D_0$-$D_7$ or latched $L_{01}$-$L_{71}$, $L_{02}$-$L_{72}$ bits must be valid for latching by their respective subsequent stages 102, 104, 106 of two outgoing serial bit periods, i.e., $2T_{bit}$. As before, this translates to a maximum outgoing serial bit rate $B_{max}$ which can be described by the following:

$$T_{bit} > T_{CLK \rightarrow Q}/2$$

Therefore:

$$B_{max} < \frac{2}{T_{CLK \rightarrow Q}} \approx \frac{2}{2T_{min}} = \frac{1}{T_{min}}$$

Further in accordance with the present invention, quadrature phases 0°, 90°, 45°, 135° used, as shown in FIG. 8, as the clock signals 118a-118d for the first interleavers 106a-106d are frequency-doubled with exclusive-OR gates 112a-112b to produce quadrature phase clock signals 119a-119b for the second interleavers 108a-108b. In turn, these frequency-doubled clock signals 119a-119b are themselves frequency-doubled with another exclusive-OR gate 113 for clocking the output interleaver 109. As discussed above, this manner of frequency-doubling quadrature clock signals 118a-118d, 119a-119b for the interleavers 106, 108 provides the requisite phase compensation for clocking the successive stages 108, 109 of interleavers.

For the cases where M≧16 bits, further successive stages of interleavers each use phase-compensated, frequency-doubled clock signals generated with "exclusive-ORed" quadrature phases of clock signals from their immediately preceding stages. Therefore, each interleaver stage is optimally clocked for maximum operational speed. Moreover, such a clocking scheme allows for easily cascading further stages of interleavers when more bits need to be multiplexed.

Throughout the foregoing discussions of the multiplexors of FIGS. 1-4, 6 and 8, it is assumed that the D-type flip-flops are triggered on the falling edges of their clock signals. However, it will be appreciated that other types of flip-flops, or other types of circuits, can be used which trigger on the rising edges of their clock signals without departing from the spirit and scope of the present invention.

It is also assumed that the "$D_1$-to-Q" and "$D_2$-to-Q" paths of the 2:1 interleavers are conductive when their clock, or select S, signals are logical ones and logical zeros, respectively. However, it will be appreciated that other types of interleavers, or multiplexors, can be used which are conductive on the inverse versions of their clock, or select S, signals without departing from the spirit and scope of the present invention.

Furthermore, it will be appreciated that other combinations and permutations of phases of the M-phase clock for the input 114a-114h and intermediate 116a-116h clock signals and interleaver clock signals 118a-118h can be used which still provide the aforementioned minimum phase margins.

It should be understood that various alternatives to the embodiments of the present invention described herein can be employed in practicing the present invention. It is intended that the following claims define the scope of the present invention and that structures and methods within the scope of these claims and their equivalents be covered thereby.

What is claimed is:

1. A synchronous, interleaved, time-division M:1 multiplexor for multiplexing M parallel input bits into a serial output bit stream having an output bit rate of B, wherein M is an integer power of two and equal to or greater than four, comprising:
   first phase-controlled latching means for receiving and latching the M parallel bits in respective synchronization with a first plurality of selected phases of a multiphase clock signal having a frequency of B/M, wherein each of the first plurality of the multiphase clock signal phases is selected to cause the latching of a corresponding received bit to occur substantially at a time at least 2/B after the bit is first received;
   first interleaver means for receiving and interleaving selected pairs of the M latched bits in respective synchronization with a second plurality of selected phases of the multiphase clock signal, wherein each of the second plurality of the multiphase clock signal phases is selected to cause the interleaving of each bit of a corresponding, selected pair of bits to occur substantially at a time at least 1/B after the bit is first received; and
   second interleaver means for receiving and interleaving selected dyads of the interleaved pairs of bits in respective synchronization with an interleaver clock signal having a frequency of 2B/M.

2. A multiplexor according to claim 1 further comprising second phase-controlled latching means for receiving and further latching the M latched bits in respective synchronization with a third plurality of selected phases of the multiphase clock signal, wherein each of the third plurality of the multiphase clock signal phases is selected to cause the latching of a corresponding received bit to occur substantially at a time at least 2/B after the bit is first received, and further wherein each of the second plurality of selected multiphase clock signal phases for the first interleaver means is further selected to cause the interleaving of each bit of the respective, selected pairs of bits to occur substantially at a time at least 2/B after the bit is first received.

3. A multiplexor according to claim 1 further comprising input latching means for receiving and latching a plurality of parallel bits in synchronization with at least one selected phase of the multiphase clock signal, and for providing the M parallel bits to the first phase-controlled latching means.

4. A multiplexor according to claim 1 further comprising multiphase clock generator means for receiving a reference clock signal having a frequency of B and generating the multiphase clock signal.

5. A multiplexor according to claim 1 further comprising interleaver clock generator means for receiving a reference clock signal and generating the interleaver clock signal.

6. A multiplexor according to claim 1, wherein the first phase-controlled latching means comprises M D-type flip-flops, wherein each of the flip-flops has a D-input, a clock input and a Q-output, and further wherein each of the D-inputs receives one of the M parallel bits, each of the clock inputs receives one of the first plurality of selected multiphase clock signal phases, and each of the Q-outputs provides one of the M latched bits.

7. A multiplexor according to claim 1, wherein the first interleaver means comprises M/2 2:1 multiplexors, wherein each of the 2:1 multiplexors has a pair of data inputs, a clock input and a data output, and further wherein each of the pairs of data inputs receives one of the selected pairs of the M latched bits, the clock input receives one of the second plurality of selected multiphase clock signal phases, and the output provides the interleaved pairs of bits.

8. A multiplexor according to claim 1, wherein the second interleaver means comprises M/4 2:1 multiplexors, wherein each of the 2:1 multiplexors has a pair of data inputs, a clock input and a data output, and further wherein each of the pairs of data inputs receives one of the selected dyads, the clock input receives the interleaver clock signal, and the output provides the interleaved selected dyads.

9. A multiplexor according to claim 2, wherein the second phase-controlled latching means comprises M D-type flip-flops, wherein each of the flip-flops has a D-input, a clock input and a Q-output, and further wherein each of the D-inputs receives one of the M latched bits, each of the clock inputs receives one of the third plurality of selected multiphase clock signal phases, and each of the Q-outputs provides one of the M further latched bits.

10. A multiplexor according to claim 3, wherein the input latching means comprises a plurality of D-type flip-flops, wherein each of the flip-flops has a D-input, a clock input and a Q-output, and further wherein each of the D-inputs receives one of the plurality of parallel bits, each of the clock inputs receives one selected phase of the multiphase clock signal, and each of M of the Q-outputs provides one of the M parallel bits.

11. A multiplexor according to claim 4, wherein the multiphase clock generator means comprises a plurality of D-type flip-flops coupled to receive and frequency-divide the reference clock signal by M.

12. A multiplexor according to claim 5, wherein the interleaver clock generator means comprises a signal delay line having an input which receives the reference clock signal and an output which provides the interleaver clock signal.

13. A synchronous, interleaved, time-division M:1 multiplexor for multiplexing M parallel input bits into a serial output bit stream having an output bit rate of B, wherein M is an integer power of two and equal to or greater than four, comprising:
   first interleaver means for receiving and interleaving selected pairs of the M parallel input bits in respective synchronization with a first plurality of selected phases of a multiphase clock signal having a frequency of B/M, wherein each of the first plurality of the multiphase clock signal phases is selected to cause the interleaving of each bit of a corresponding, selected pair of bits to occur substantially at a time at least 1/B after the bit is first received;
   second interleaver means for receiving and interleaving selected dyads of the interleaved pairs of bits in respective synchronization with an interleaver clock signal having a frequency of 2B/M; and
   interleaver clock generator means for generating the interleaver clock signal in synchronization with at least one of a second plurality of selected phases of the multiphase clock signal, wherein the interleaver clock signal becomes active substantially simultaneously as the selected dyads are first received.

14. A multiplexor according to claim 13 further comprising phase-controlled latching means for receiving and latching a plurality of parallel bits in synchronization with a third plurality of selected phases of the multiphase clock signal, and for providing the M parallel bits to the first interleaver means.

15. A multiplexor according to claim 13 further comprising multiphase clock generator means for receiving a reference clock signal having a frequency of B and generating the multiphase clock signal.

16. A multiplexor according to claim 13, wherein the first interleaver means comprises M/2 2:1 multiplexors, where each of the 2:1 multiplexors has a pair of data inputs, a clock input and a data output, and further wherein each of the pairs of data inputs receives one of the selected pairs of M parallel bits, the clock input receives one of the first plurality of selected multiphase clock signal phases, and the output provides the interleaved pairs of bits.

17. A multiplexor according to claim 13, wherein the second interleaver means comprises M/4 2:1 multiplexors, wherein each of the 2:1 multiplexors has a pair of data inputs, a clock input and a data output, and further wherein each of the pairs of data inputs receives one of the selected dyads, the clock input receives the interleaver clock signal, and the output provides the interleaved selected dyads.

18. A synchronous, interleaved, time-division M:1 multiplexor for multiplexing M parallel input bits into a serial output bit stream having an output bit rate of B, wherein M is an integer power of two and equal to or greater than four, comprising:
first interleaver means for receiving and interleaving selected pairs of the M parallel input bits in respective synchronization with a plurality of selected phases of a multiphase clock signal having a frequency of B/M, wherein each of the plurality of the multiphase clock signal phases is selected to cause the interleaving of each bit of a corresponding, selected pair of bits to occur substantially at a time at least 1/B after the bit is first received;
second interleaver means for receiving and interleaving selected dyads of the interleaved pairs of bits in respective synchronization with an interleaver clock signal having a frequency of 2B/M; and
interleaver clock generator means for generating the interleaver clock signal in synchronization with the multiphase clock signal, wherein the interleaver clock signal becomes active substantially simultaneously as the selected dyads are first received, and further wherein the interleaver clock generator means and comprising the further step of further selecting the second plurality of selected multiphase clock signal phases to cause the interleaving of each bit of the respective, selected pair of bits to occur substantially at a time at least 2/B after the bit is first received.

19. A multiplexor according to claim 14, wherein the phase-controlled latching means comprises a plurality of D-type flip-flops, wherein each of the flip-flops has a D-input, a clock input and a Q-output, and further wherein each of the D-inputs receives one of the plurality of parallel bits, each of the clock inputs receives one of the third plurality of selected phases of the multiphase clock signal, and each of M of the Q-outputs provides one of the M parallel bits.

20. A multiplexor according to claim 15, wherein the multiphase clock generator means comprises a plurality of D-type flip-flops coupled to receive and frequency-divide the reference clock signal by M.

21. A synchronous, interleaved, time-division M:1 multiplexor for multiplexing M parallel input bits into a serial output bit stream having an output bit rate of B, wherein M is an integer power of two and equal to or greater than four, comprising:
first phase-controlled latching means for receiving and latching the M parallel input bits in respective synchronization with a first plurality of selected phases of a multiphase clock signal having a frequency of B/M, wherein each of the first plurality of the multiphase clock signal phases is selected to cause the latching of a corresponding received bit to occur at a time at least 2/B after the bit is first received;
first interleaver means for receiving and interleaving selected pairs of the M latched bits in respective synchronization with a second plurality of selected phases of the multiphase clock signal, wherein each of the second plurality of the multiphase clock signal phases is selected to cause the interleaving of each bit of a corresponding, selected pair of bits to occur at a time at least 1/B after the bit is first received;
second interleaver means for receiving and interleaving selected dyads of the interleaved pairs of bits in respective synchronization with an interleaver clock signal having a frequency of 2/M; and
interleaver clock generator means for generating the interleaver clock signal in synchronization with the multiphase clock signal, wherein the interleaver clock signal becomes active substantially simultaneously as the selected dyads are first received.

22. A multiplexor according to claim 21 further comprising second phase-controlled latching means for receiving and further latching the M latched bits in respective synchronization with a third plurality of selected phases of the multiphase clock signal, wherein each of the third plurality of the multiphase clock signal phases is selected to cause the latching of a corresponding received bit to occur substantially at a time at least 2/B after the bit is first received, and further wherein each of the second plurality of selected multiphase clock signal phases for the first interleaver means is further selected to cause the interleaving of each bit of the respective, selected pairs of bits to occur substantially at a time at least 2/B after the bit is first received.

23. A multiplexor according to claim 21 further comprising input latching means for receiving and latching a plurality of parallel bits in synchronization with at least one selected phase of the multiphase clock signal, and for providing the M parallel bits to the first phase-controlled latching means.

24. A multiplexor according to claim 21 further comprising multiphase clock generator means for receiving a reference clock signal having a frequency of B and generating the multiphase clock signal.

25. A multiplexor according to claim 21, wherein the first phase-controlled latching means comprises M D-type flip-flops, wherein each of the flip-flops has a D-input, a clock input and a Q-output, and further wherein each of the D-inputs receives one of the M parallel bits, each of the clock inputs receives one of the first plurality of selected multiphase clock signal phases, and each of the Q-outputs provides one of the M latched bits.

26. A multiplexor according to claim 21, wherein the first interleaver means comprises M/2 2:1 multiplexors, wherein each of the 2:1 multiplexors has a pair of data inputs, a clock input and a data output, and further wherein each of the pairs of data inputs receives one of the selected pairs of the M latched bits, the clock input receives one of the second plurality of selected multiphase clock signal phases, and the output provides the interleaved pairs of bits.

27. A multiplexor according to claim 21, wherein the second interleaver means comprises M/4 2:1 multiplexors, wherein each of the 2:1 multiplexors has a pair of data inputs, a clock input and a data output, and further wherein each of the pairs of data inputs receives one of the selected dyads, the clock input receives the interleaver clock signal, and the output provides the interleaved selected dyads.

28. A multiplexor according to claim 21, wherein the interleaver clock generator means comprises an exclusive-OR gate coupled to receive the second plurality of selected phases of the multiphase clock signal and provide the interleaver clock signal in synchronization therewith.

29. A multiplexor according to claim 28, wherein the plurality of selected phases received by the interleaver clock generator means comprises a pair of quadrature phases of the multiphase clock signal.

30. A multiplexor according to claim 22, wherein the second phase-controlled latching means comprises M D-type flip-flops, wherein each of the flip-flops has a D-input, a clock input and a Q-output, and further wherein each of the D-inputs receives one of the M latched bits, each of the clock inputs receives one of the third plurality of selected multiphase clock signal phases, and each of the Q-outputs provides one of the M further latched bits.

31. A multiplexor according to claim 23, wherein the input latching means comprises a plurality of D-type flip-flops, wherein each of the flip-flops has a D-input, a clock input and a Q-output, and further wherein each of the D-inputs receives one of the plurality of parallel bits, each of the clock inputs receives one selected phase of the multiphase clock signal, and each of M of the Q-outputs provides one of the M parallel bits.

32. A multiplexor according to claim 24, wherein the multiphase clock generator means comprises a plurality of D-type flip-flops coupled to receive and frequency-divide the reference clock signal by M.

33. A method for synchronously interleaving and time-division M:1 multiplexing M parallel input bits into a serial output bit stream having an output bit rate of B, wherein M is an integer power of two and equal to or greater than four, comprising the steps of:
receiving and latching the M parallel input bits in respective synchronization with a first plurality of selected phases of a multiphase clock signal having a frequency of B/M, wherein each of the first plurality of the multiphase clock signal phases is selected to cause the latching of a corresponding bit to occur substantially at a time at least 2/B after the respective bit is first received;
receiving and interleaving selected pairs of the M latched bits in respective synchronization with a second plurality of selected phases of the multiphase clock signal, wherein each of the second plurality of the multiphase clock signal phases is selected to cause the interleaving of each bit of a corresponding, selected pair of bits to occur substantially at a time at least 1/B after the bit is first received; and
receiving and interleaving selected dyads of the interleaved pairs of bits in respective synchronization with an interleaver clock signal having a frequency of 2B/M.

34. A method according to claim 33 further comprising the step of receiving and further latching the M latched bits in respective synchronization with a third plurality of selected phases of the multiphase clock signal, wherein each of the third plurality of the multiphase clock signal phases is selected to cause the latching of a corresponding bit to occur substantially at a time at least 2/B after the respective bit is first received, and comprising the further step of further selecting the second plurality of selected multiphase clock signal phases to cause the interleaving of each bit of the respective, selected pair of bits to occur substantially at a time at least 2/B after the bit is first received.

35. A method for synchronously interleaving and time-division M:1 multiplexing M parallel input bits into a serial output bit stream having an output bit rate of B, wherein M is an integer power of two and equal to or greater than four, comprising the steps of:
receiving and interleaving selected pairs of the M parallel input bits in respective synchronization with a first plurality of selected phases of a multiphase clock signal having a frequency of B/M, wherein each of the first plurality of the multiphase clock signal phases is selected to cause the interleaving of each bit of a corresponding, selected pair of bits to occur substantially at a time at least 1/B after the bit is first received;
receiving and interleaving selected dyads of the interleaved pairs of bits in respective synchronization with an interleaver clock signal having a frequency of 2B/M; and
generating the interleaver clock signal in synchronization with at least on of a second plurality of selected phases of the multiphase clock signal, wherein the interleaver clock signal becomes active substantially simultaneously as the selected dyads are first received.

36. A method for synchronously interleaving and time-division M:1 multiplexing M parallel input bits into a serial output bit stream having an output bit rate of B, wherein M is an integer power of two and equal to or greater than four, comprising the steps of:
receiving and latching the M parallel input bits in respective synchronization with a first plurality of selected phases of a multiphase clock signal having a frequency of B/M, wherein each of the first plurality of the multiphase clock signal phases is selected to cause the latching of a corresponding bit to occur at a time at least 2/B after the respective bit is first received;
receiving and interleaving selected pairs of the M latched bits in respective synchronization with a second plurality of selected phases of the multiphase clock signal, wherein each of the second plurality of the multiphase clock signal phases is selected to cause the interleaving of each bit of a corresponding, selected pair of bits to occur at a time at least 1/B after the bit is first received;
receiving and interleaving selected dyads of the interleaved pairs of bits in respective synchronization with an interleaver clock signal having a frequency of 2B/M; and
generating the interleaver clock signal in synchronization with the multiphase clock signal, wherein the interleaver clock signal becomes active substantially simultaneously as the selected dyads are first received.

37. A method according to claim 36 further comprising the step of receiving and further latching the M latched bits in respective synchronization with a third plurality of selected phases of the multiphase clock signal, wherein each of the third plurality of the multiphase clock signal phases is selected to cause the latching of a corresponding bit to occur substantially at a time at least 2/B after the respective bit is first received, and comprising the further step of further selecting the second plurality of selected multiphase clock signal phases to cause the interleaving of each bit of the respective, selected pair of bits to occur substantially at a time at least 2/B after the bit is first received.

38. A multiplexor according to claim 18, wherein the plurality of selected phases received by the interleaver clock generator means comprises a pair of quadrature phases of the multiphase clock signal.

* * * * *